(12) United States Patent
Kitamura et al.

(10) Patent No.: US 10,744,544 B2
(45) Date of Patent: Aug. 18, 2020

(54) CLEANING APPARATUS

(71) Applicant: Shibuya Machinery Co., Ltd., Kanazawa-shi, Ishikawa (JP)

(72) Inventors: Takahito Kitamura, Kanazawa (JP); Masahiro Daijo, Kanazawa (JP)

(73) Assignee: SHIBUYA MACHINERY CO., LTD., Kanazawa-Shi, Ishikawa (JP)

( * ) Notice: Subject to any disclaimer, the term of this patent is extended or adjusted under 35 U.S.C. 154(b) by 215 days.

(21) Appl. No.: 15/907,708

(22) Filed: Feb. 28, 2018

(65) Prior Publication Data

US 2018/0281032 A1    Oct. 4, 2018

(30) Foreign Application Priority Data

Mar. 31, 2017  (JP) .................................. 2017-071663
Sep. 12, 2017  (JP) .................................. 2017-175073

(51) Int. Cl.
| | |
|---|---|
| *B05B 13/06* | (2006.01) |
| *B08B 3/02* | (2006.01) |
| *B08B 9/08* | (2006.01) |
| *B08B 9/093* | (2006.01) |
| *F16H 1/14* | (2006.01) |

(52) U.S. Cl.
CPC .......... *B08B 9/0813* (2013.01); *B05B 13/069* (2013.01); *B05B 13/0636* (2013.01); *B08B 3/024* (2013.01); *B08B 9/0936* (2013.01); *B08B 2209/08* (2013.01); *F16H 1/14* (2013.01)

(58) Field of Classification Search
CPC ... B05B 13/0636; B05B 13/069; B08B 3/024; B08B 9/0813; B08B 9/093; B08B 9/0936; B08B 2209/08; F16H 1/14
USPC ......................................................... 134/181
See application file for complete search history.

(56) References Cited

U.S. PATENT DOCUMENTS

2007/0007365 A1*  1/2007  Kitamura .................. B05B 3/02
                                                            239/237

FOREIGN PATENT DOCUMENTS

JP            4636956 B2     2/2011

* cited by examiner

*Primary Examiner* — Levon J Shahinian
(74) *Attorney, Agent, or Firm* — Flynn Thiel, P.C.

(57) ABSTRACT

A cleaning apparatus 1 includes: a pivot rotary shaft 8 attached with a nozzle 3; a first motor 14 for revolving and rotating the pivot rotary shaft 8 via an inner tube 7 and bevel gears 11 and 12; a second motor 16 for solely rotating an outer tube 15; and a control device 18 for controlling the operation of both the motors 14 and 16. The outer tube 15, and the pivot rotary shaft 8 and the nozzle 3 are operated together via the bevel gears 11 and 12. The first motor 14 is operated with the cleaning fluid W being sprayed from the nozzle 3.

6 Claims, 5 Drawing Sheets revolution direction of revolution

CLEANING APPARATUS

BACKGROUND OF THE INVENTION

Field of the Invention

The present invention relates to a cleaning apparatus, and more particularly to, for example, a cleaning apparatus configured such that a nozzle is caused to enter into a tank and a cleaning fluid is sprayed from the nozzle to clean the inner surface of the tank.

Description of the Related Art

Conventionally, a cleaning apparatus in which a nozzle is caused to enter into a tank, etc. to clean the inner surface of the tank has been publicly known (for example, Japanese Patent No. 4636956).

Such a conventional cleaning apparatus includes a rotary shaft which acts as a driving side, a pivot rotary shaft which is disposed at a lower end part thereof, and a nozzle attached to the pivot rotary shaft, in which the rotary shaft and the pivot rotary shaft are operated together by a pair of bevel gears. And upon performing cleaning, a cleaning fluid is sprayed from the nozzle, and the rotary shaft is rotated so that the pivot rotary shaft is revolved and rotated via the pair of bevel gears. As a result, the nozzle is moved in a 3-dimensional movement trajectory, and therefore the cleaning fluid is sprayed onto the inner surface of the tank in a 3-dimensional fashion to clean the same.

In the cleaning apparatus of Japanese Patent No. 4636956, since the movement trajectory of the nozzle for spraying cleaning fluid is determined by the number of teeth of a pair of bevel gears to be combined, the movement trajectory of cleaning fluid becomes always constant. For that reason, there is a risk that the cleaning effect differs in an area which comes into contact with the cleaning fluid and in an area which will not, in an object to be cleaned (a tank) so that imperfect cleaning may occur in the area which will not come into contact with the cleaning fluid.

Moreover, as the distance from the nozzle increases, in addition to that a spacing between the movement trajectories of the cleaning fluid increases, the cleaning pressure decreases making it difficult to achieve sufficient cleaning so that there are risks of nonuniform cleaning and imperfect cleaning. Further, even if the inner surface of the tank is clean excepting some areas, if there is an area which is difficult to be cleaned (defective cleaning), since it is necessary to perform cleaning by spraying a large amount of cleaning fluid from the nozzle in accordance with the area difficult to be cleaned, increase the cleaning time, or increase the number of cleanings, a problem exists in that the cleaning time increases and also the use amount of the cleaning fluid increases.

Further, performing cleaning of objects to be cleaned having various shapes by spraying the cleaning fluid from the nozzle under the same condition will result in spraying the cleaning fluid from the nozzle oriented upward even when cleaning for example a cylindrical pot with an open top face, causing an unnecessary consumption of cleaning fluid and waste in cleaning time, and the cleaning effect decreases.

SUMMARY OF THE INVENTION

In view of the above described circumstances, a first aspect of the present invention is a cleaning apparatus, including: a rotary shaft supported to be axially rotatable; a first fluid passage formed in the rotary shaft; a pivot rotary shaft supported to be axially rotatable in a direction substantially orthogonal to the rotary shaft and revolved with the rotary shaft as a rotational center; a second fluid passage provided in the pivot rotary shaft and being in communication with the first fluid passage; a nozzle provided on the pivot rotary shaft and for spraying cleaning fluid to an object to be cleaned, the cleaning fluid being supplied via the first fluid passage and the second fluid passage; an outer tube surrounding the rotary shaft and being supported to be axially rotatable; a first bevel gear provided on the outer tube; a second bevel gear provided on the pivot rotary shaft and meshing with the first bevel gear; a first drive source for rotating the rotary shaft; a second drive source for rotating the outer tube; and a control device for controlling the operations of the first drive source and the second drive source, wherein the nozzle is inserted into the object to be cleaned, and a cleaning fluid is sprayed from the nozzle to clean the inner surface of the object to be cleaned, the cleaning apparatus being characterized in that the control device is capable of operating the first drive source and the second drive source at the same time, and is also capable of controlling rotational frequencies of both the drive sources to change a movement trajectory of the nozzle when the nozzle sprays the cleaning fluid.

Moreover, a second aspect of the present invention is a cleaning apparatus, including: a rotary shaft supported to be axially rotatable; a first fluid passage formed in the rotary shaft; a pivot rotary shaft supported to be axially rotatable in a direction substantially orthogonal to the rotary shaft and revolved with the rotary shaft as a rotational center; a second fluid passage provided in the pivot rotary shaft and being in communication with the first fluid passage; a nozzle provided on the pivot rotary shaft and for spraying cleaning fluid to an object to be cleaned, the cleaning fluid being supplied via the first fluid passage and the second fluid passage, an outer tube surrounding the rotary shaft and being supported to be axially rotatable; a first bevel gear provided on the outer tube; a second bevel gear provided on the pivot rotary shaft and meshing with the first bevel gear; a first drive source for rotating the rotary shaft; a second drive source for rotating the outer tube; and a control device for controlling the operations of the first drive source and the second drive source, wherein the nozzle is inserted into the object to be cleaned, and a cleaning fluid is sprayed from the nozzle to clean the inner surface of the object to be cleaned, the cleaning apparatus being characterized in that the control device is capable of operating the second drive source with the operation of the first drive source being stopped, to cause the nozzle to be rotated without being revolved.

According to such configurations, it is possible to suppress the consumption of cleaning fluid and electric power. Moreover, it is possible to perform the efficient cleaning of objects to be cleaned in a reduced cleaning time.

DETAILED DESCRIPTION OF THE PREFERRED EMBODIMENTS

Figure 1:
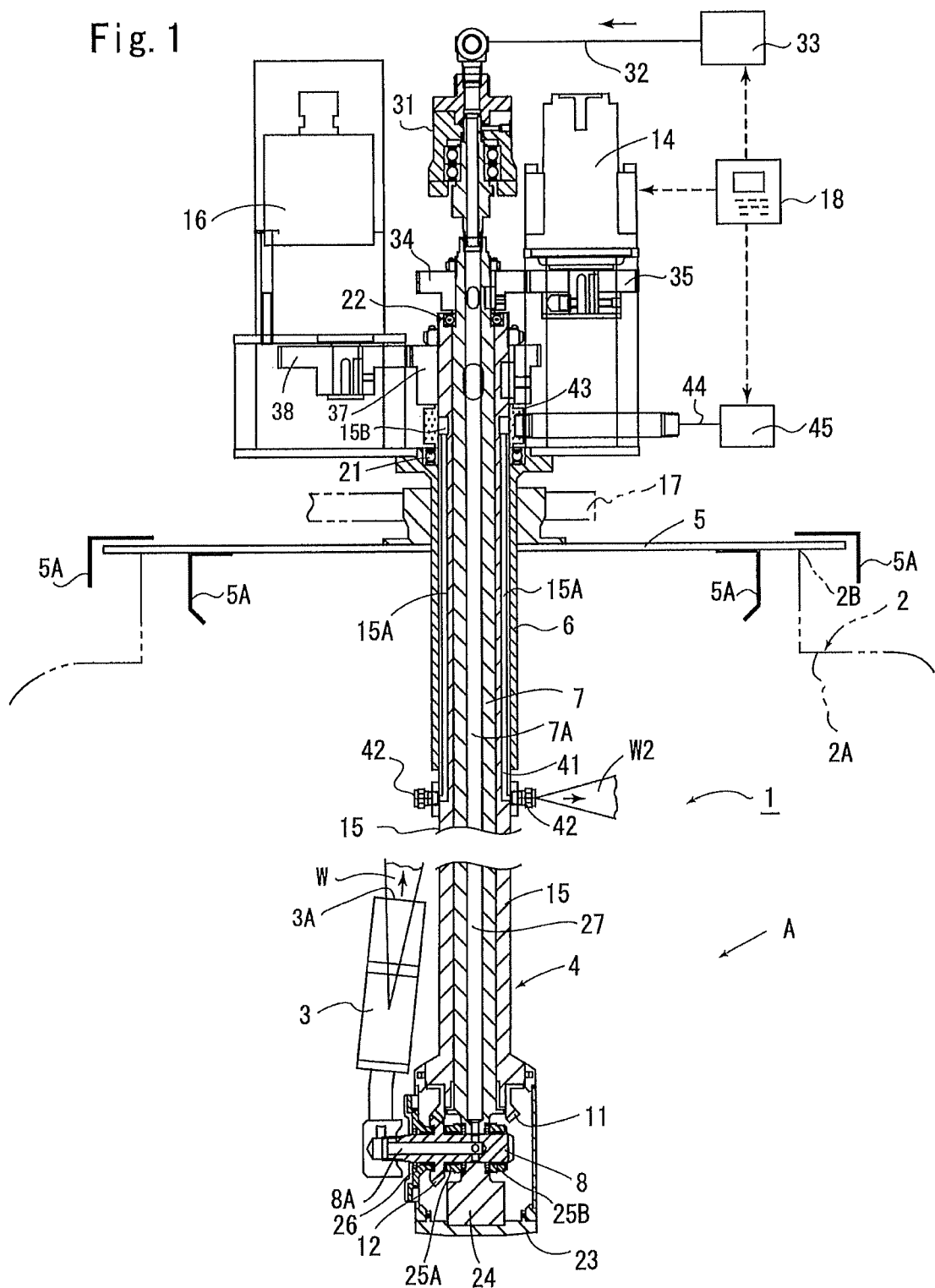
FIG. 1 is a cross-sectional view to show an embodiment of the present invention.

Hereinafter, describing the present invention on an illustrated embodiment, in FIGS. 1 to 3, reference numeral 1 indicates a cleaning apparatus for cleaning an inner surface 2A of a tank 2 as an object to be cleaned. The cleaning apparatus 1 includes: a cleaning unit 4 for spraying cleaning fluid W (water) from a nozzle 3 towards the inner surface 2A of the tank 2; a tubular support member 6 for rotatably supporting the cleaning unit 4 and being connected with a lid 5 at an upper part of its outer peripheral portion; a first motor 14 for rotating an inner tube 7; a second motor 16 for rotating an outer tube 15; a lift mechanism 17 for supporting the lid 5 and the cleaning unit 4 via the support member 6, and moving them up and down when required; and a control device 18 for controlling the operations of both the motors 14 and 16 and the lift mechanism 17.

Here, first, outlined operation steps when cleaning the tank 2 will be described. When the tank 2 as the object to be cleaned is carried to a cleaning position A, the cleaning unit 4 and the lid 5 are moved down by a required amount by the lift mechanism 17, so that the cleaning unit 4 is inserted into the tank 2, and an upper-end opening part 2B of the tank 2 is closed by the lid 5 (see FIG. 2).

Figure 2:
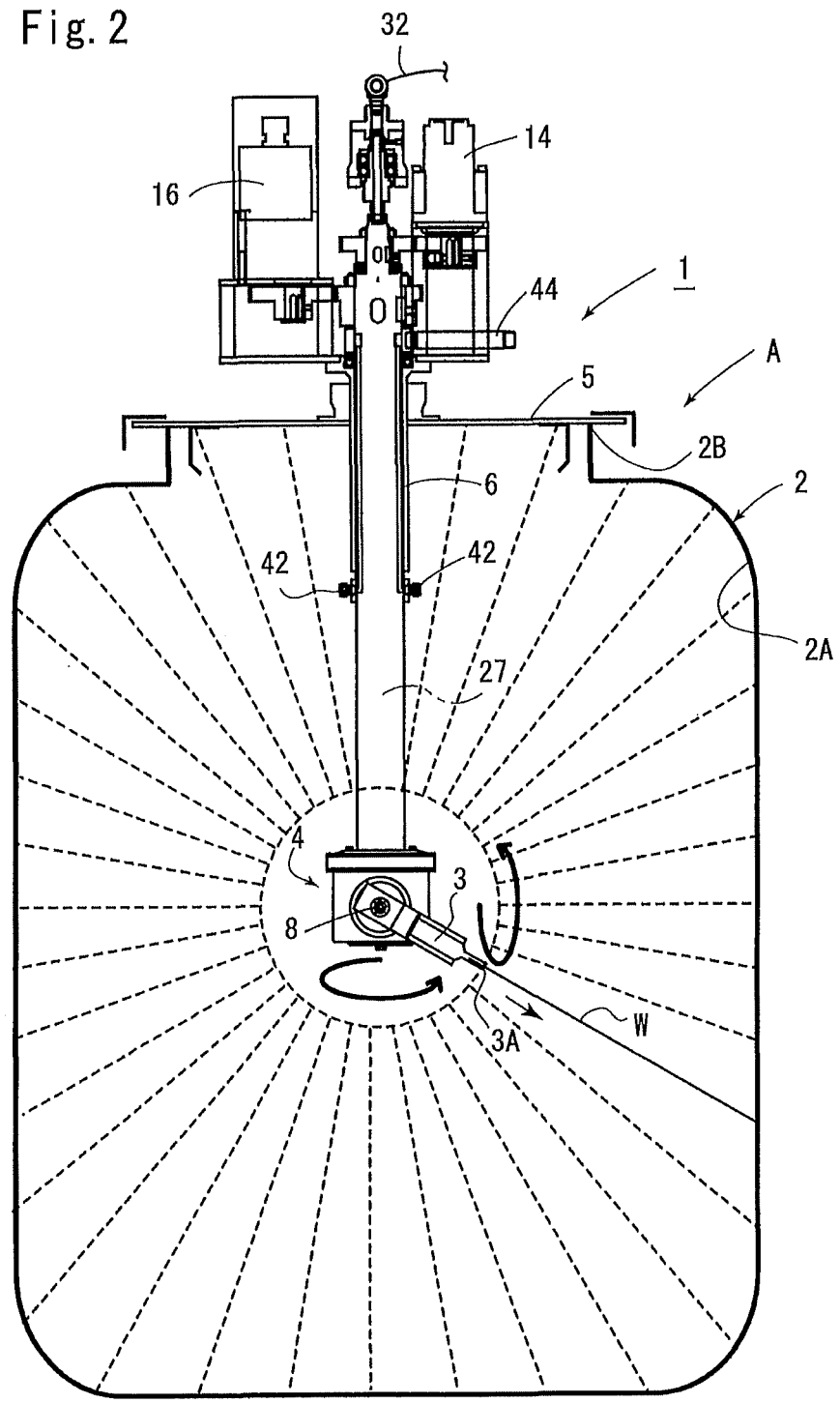
FIG. 2 is an explanatory diagram to show a movement trajectory of a nozzle of a cleaning apparatus of FIG. 1.

In this state, the cleaning fluid W is sprayed from the nozzle 3, and the nozzle 3 is revolved around the rotary shaft and is rotated around the pivot rotary shaft 8 to move in a 3-dimensional movement trajectory so that the cleaning fluid W (water) is 3-dimensionally sprayed onto the inner surface 2A of the tank 2 thereby cleaning the inner surface 2A of the tank 2 (see FIG. 2). Note that the cleaning fluid after cleaning is discharged from a discharge port which is formed in the bottom part of the tank 2 and is not shown, to the outside.

Upon completion of the cleaning operation of the inner surface 2A of the tank 2, since the cleaning unit 4 and the lid 5 are lifted to an original lifted position by the lift mechanism 17, the lid 5 is separated from the upper-end opening part 2B of the tank 2, and the cleaning unit 4 is lifted to and stopped at an original position which is on the upper side of the opening part 2B of the tank 2. Thereafter, the tank 2 after cleaning is carried out from the cleaning position A by a carry-out mechanism not shown.

As shown in FIG. 1, the cleaning unit 4 includes: an outer tube 15 which is rotatably supported by a support member 6 via a bearing 21; an inner tube 7 as a rotary shaft rotatably supported on the inner side of the outer tube 15 via a bearing 22; a pivot rotary shaft 8 which is disposed in a horizontal direction at a position of a lower end part of the inner tube 7 and is axially rotatable; a nozzle 3 interconnected with a tip end part of the pivot rotary shaft 8; a bevel gear 11 fitted into a lower end part of the outer tube 15; and a bevel gear 12 fitted into an outer peripheral portion of the pivot rotary shaft 8 and meshing with the bevel gear 11.

The inner tube 7 and the outer tube 15 are supported in a vertical direction and configured to be axially rotatable in that state. A box-type gear case 23 is disposed in a lower part of the outer tube 15, and the bevel gears 11 and 12, the pivot rotary shaft 8, etc. are covered by the gear case 23. This gear case 23 is configured to be mutually rotatable in a peripheral direction with respect to the outer tube 15.

A cylindrical support member 24 is disposed at the center in the gear case 23, and the pivot rotary shaft 8 is supported between the lower end part of the inner tube 7 and the upper end of the support member 24 so as to be pivotable around the rotary shaft and axially rotatable by a pair of bearings 25A and 25B. That is, the pivot rotary shaft 8 is supported in a horizontal direction orthogonal to the inner tube 7 at a position of the lower end part of the inner tube 7, so as to be axially rotatable. The tip end of the pivot rotary shaft 8 is configured to protrude to the outside of the gear case 23 while keeping liquid tightness with a seal member 26, and a base part of the nozzle 3 is interconnected therewith in an orthogonal direction. In this way, since the nozzle 3 is interconnected in a direction orthogonal to the axis of the pivot rotary shaft 8, when the pivot rotary shaft 8 is rotated, the nozzle 3 is caused to rotate (pivot) in a substantially vertical plane. Note that in the present embodiment, a flat nozzle which sprays cleaning fluid W in a wide-width is adopted as the nozzle 3. For that reason, a spray aperture 3A, which is at a tip end of the nozzle 3, has an elongated linear shape. In the present embodiment, the base part of the nozzle 3 is attached to the pivot rotary shaft 8 such that the longitudinal direction of the spray aperture 3A is approximately parallel with the axis of the pivot rotary shaft 8 (see FIG. 1).

The bevel gear 12 is fitted into the outer peripheral part of the pivot rotary shaft 8, and this bevel gear 12 meshes with the bevel gear 11 which is fitted as a sun gear into a lower-end outer peripheral part of the outer tube 15. For that reason, when the inner tube 7 is rotated, the pivot rotary shaft 8 revolves in a predetermined direction with the inner tube 7 as a rotational center. In that occasion, the pivot rotary shaft 8 rotates (pivots) in a predetermined direction due to an intermeshing between both the bevel gears 11 and 12. As a result of that, the nozzle 3 is configured to move in a 3-dimensional movement trajectory in a state that the longitudinal direction of the spray aperture 3A at the tip end is approximately parallel with the axis of the pivot rotary shaft 8 (see FIG. 2).

The internal space of the inner tube 7 which has a tubular shape provides a fluid passage 7A through which water as the cleaning fluid W passes, and the lower end part of the fluid passage 7A is always in communication with a fluid passage 8A formed in the pivot rotary shaft 8. A cleaning fluid passage 27 for feeding the cleaning fluid W to the nozzle 3 is composed of these fluid passages 7A and 8A.

The upper end of the inner tube 7 (upper end of the fluid passage 11A) is connected to a supply source 33 of the cleaning fluid W via a connector 31 and a conduit 32. This supply source 33 is configured to be controlled in operation by a control device 18, and the control device 18 is configured to supply the cleaning fluid W (water) to the cleaning fluid passage 27 from the supply source 33 via the conduit 32 when required. In that occasion, the cleaning fluid W supplied to the cleaning fluid passage 27 is sprayed from the tip end of the nozzle 3.

A gear 34 is attached to an outer peripheral part of the inner tube 7 which is exposed to above the outer tube 15, and this gear 34 meshes with a gear 35 fitted to a drive shaft of a first motor 14. The operation of the first motor 14 is controlled by the control device 18 such that when the control device 18 operates the first motor 14, the inner tube 7 is axially rotated in a predetermined direction via the gears 34 and 35. In that occasion, it is configured such that as the pivot rotary shaft 8 is revolved as described above, the pivot rotary shaft 8 and the nozzle 3 are rotated through the intermeshing between both the bevel gears 11 and 12. As a result of this, the nozzle 3 is moved in a 3-dimensional movement trajectory.

A gear 37 is attached to an outer peripheral part of the outer tube 15 which is exposed above the support member 6, and this gear 37 meshes with a gear 38 fitted to a drive shaft of a second motor 16. The operation of the second motor 16 is controlled by the control device 18 such that when the control device 18 operates the second motor 16, the outer tube 15 is axially rotated in a predetermined direction via the gears 37 and 38. In that occasion, it is configured such that the pivot rotary shaft 8 and the nozzle 3 are rotated through the intermeshing between both the bevel gears 11 and 12.

In this way, in the present embodiment, independently of the revolution and rotation of the pivot rotary shaft 8 by the first motor 14, it is possible to independently rotate the outer tube 15 by the second motor 16 when required, which makes it possible to change the rotational frequency during rotation or stop the rotation of the pivot rotary shaft 8 during revolution.

Further, in the present embodiment, a second cleaning fluid passage 41 which is in a different system from that of the cleaning fluid passage 27 is provided in the outer tube 15. To be more specific, at least one axial passage 15A is formed in an upper part in the outer tube 15, and this constitutes a second cleaning fluid passage 41. The lower end part of the axial passage 15A is opened on an outer peripheral surface of the outer tube 15 which is located adjacent and below the support member 6, and there is attached a spray aperture 42 oriented toward a horizontal direction. Note that a plurality of axial passages 15A may be formed at a predetermined spacing in the circumferential direction of the outer tube 15, and a plurality of spray apertures 42 may be attached to the lower end part thereof.

The upper end part of the axial passage 15A is in communication with an annular groove 15B on the outer peripheral surface, and the annular groove 15B is covered with an annular seal member 43. One end of the conduit 44 is in communication with the second cleaning fluid passage 41 via the annular seal member 43 and the annular groove 15B. The other end of the conduit 44 is connected to a supply source 45 which supplies a cleaning fluid W2 which is composed of, for example, foamy detergent, and is different from the cleaning fluid W, and this supply source 45 is configured to be controlled in operation by the control device 18. When the control device 18 operates the supply source 45, since the cleaning fluid W2 (foamy detergent) is supplied to the second cleaning fluid passage 41 via the conduit 44, it is configured such that the cleaning fluid W2 is sprayed outward from a plurality of spray apertures 42 provided in the outer tube 15. By spraying the cleaning fluid W2 from the spray aperture 42 while rotating the outer tube 15 by the second motor 16 in an early stage of the cleaning operation, it is made possible to preliminarily clean the inner surface 2A of the tank 2 with the cleaning fluid W2 which is a foamy detergent. Note that it is possible to use, as the cleaning fluid W2, for example, sterilized water, clean water, etc. without being limited to a detergent. Moreover, without being limited to preliminary cleaning in an early stage of the cleaning operation, for example, in a late stage of the cleaning operation, clean water may be sprayed from the spray aperture 42 to be used for rinsing.

The lid 5 attached to the support member 6 is formed into a disc shape, and is provided in the outer peripheral part and a proximal and inner position thereof with an annular stopper 5A for preventing the leakage and scattering of fluid.

In the above described configuration, when the tank 2 is carried in to the cleaning position A with the cleaning unit 4 and the lid 5 being stopped at a lifting end position, the lid 5 is moved down along with the cleaning unit 4 by the lift mechanism 17. As a result of that, the nozzle 3, etc. of the cleaning unit 4 are inserted into the tank 2, and the upper-end opening part 2B of the tank 2 is closed by the lid 5 (FIG. 2).

Thereafter, the operations of both the motors 14 and 16, the supply sources 33 and 45, etc. are controlled by the control device 18 as described below so that the cleaning operation of the inner surface 2A of the tank 2 is performed.

In the present embodiment, before the cleaning fluid W (water) is sprayed from the nozzle 3 to clean the inner surface 2A, a preliminary cleaning is performed by spraying the cleaning fluid W2 which is a foamy detergent to the inner surface 2A of the tank 2. That is, first, the supply source 45 of the cleaning fluid W2 is operated, and at the same time the second motor 16 is also operated. For that reason, the foamy cleaning fluid W2 is supplied to the cleaning fluid passage 41 of the outer tube 15 via the conduit 44, and the outer tube 15 is axially rotated (see FIG. 1). As a result of that, each spray aperture 42 spraying the cleaning fluid W2 is revolved as well so that the foamy cleaning fluid W2 is sprayed onto the inner surface 2A of the tank 2. Note that since the supply source 33 is not operated at this time, although the pivot rotary shaft 8 and the nozzle 3 are rotated via the bevel gears 11 and 12 as the outer tube 15 rotates, the cleaning fluid W will not be sprayed from the nozzle 3.

In this way, by spraying the cleaning fluid W2 onto the inner surface 2A from the spray aperture 42 while rotating the outer tube 15 for a predetermined time period, preliminary cleaning of the inner surface of the tank 2 is performed.

When the preliminary cleaning is performed for the predetermined time period, next, main cleaning by using the nozzle 3 is performed. That is, since first the operations of the second motor 16 and the supply source 45 are stopped, the rotation of the outer tube 15 is stopped, and the spraying of the cleaning fluid W2 from the spray aperture 42 is stopped.

Then, since the supply source 33 is operated as the drive motor 14 is operated, the cleaning fluid W (water) is supplied to the cleaning fluid passage 27 via the conduit 32 and the cleaning fluid W is sprayed from the nozzle 3. Moreover, since the inner tube 7 is axially rotated, the pivot rotary shaft 8 is revolved, and is rotated via the bevel gears 11 and 12 (see FIG. 2). For that reason, the nozzle 3 is moved in a 3-dimensional movement trajectory, and thereby the cleaning fluid W is sprayed onto the entire region of the inner surface 2A of the tank 2 (see FIG. 2). As a result of this, the inner surface 2A of the tank 2 is cleaned with the cleaning fluid W (water). Note that the cleaning fluid W after cleaning which has been sprayed from the nozzle 3 to the tank 2 is discharged to the outside from a drain port, which is formed in the lower part of the tank 2 and is not shown.

In this way, the inner surface 2A of the tank 2 is sprayed with the cleaning fluid W and is cleaned; however, there may be a case in which the entire region of the inner surface 2A to be cleaned is not cleaned sufficiently. To be specific, regarding upper and lower corners and specific areas in the vertical direction of the inner surface 2A of the tank 2, solely spraying the cleaning fluid W from the nozzle 3 as described above may result in insufficient cleaning.

Accordingly, in the present embodiment, a finish cleaning is successively performed by preferentially spraying the cleaning fluid W onto a required area of the inner surface of the tank 2. To be specific, the second motor 16 is operated at a required rotational frequency with the operations of the supply source 33 and the first motor 14 being continued. Then, since the outer tube 15 is rotated via the gears 37 and 38, the rotation of the bevel gear 12 is suppressed by the rotation of the bevel gear 11.

Figure 3:
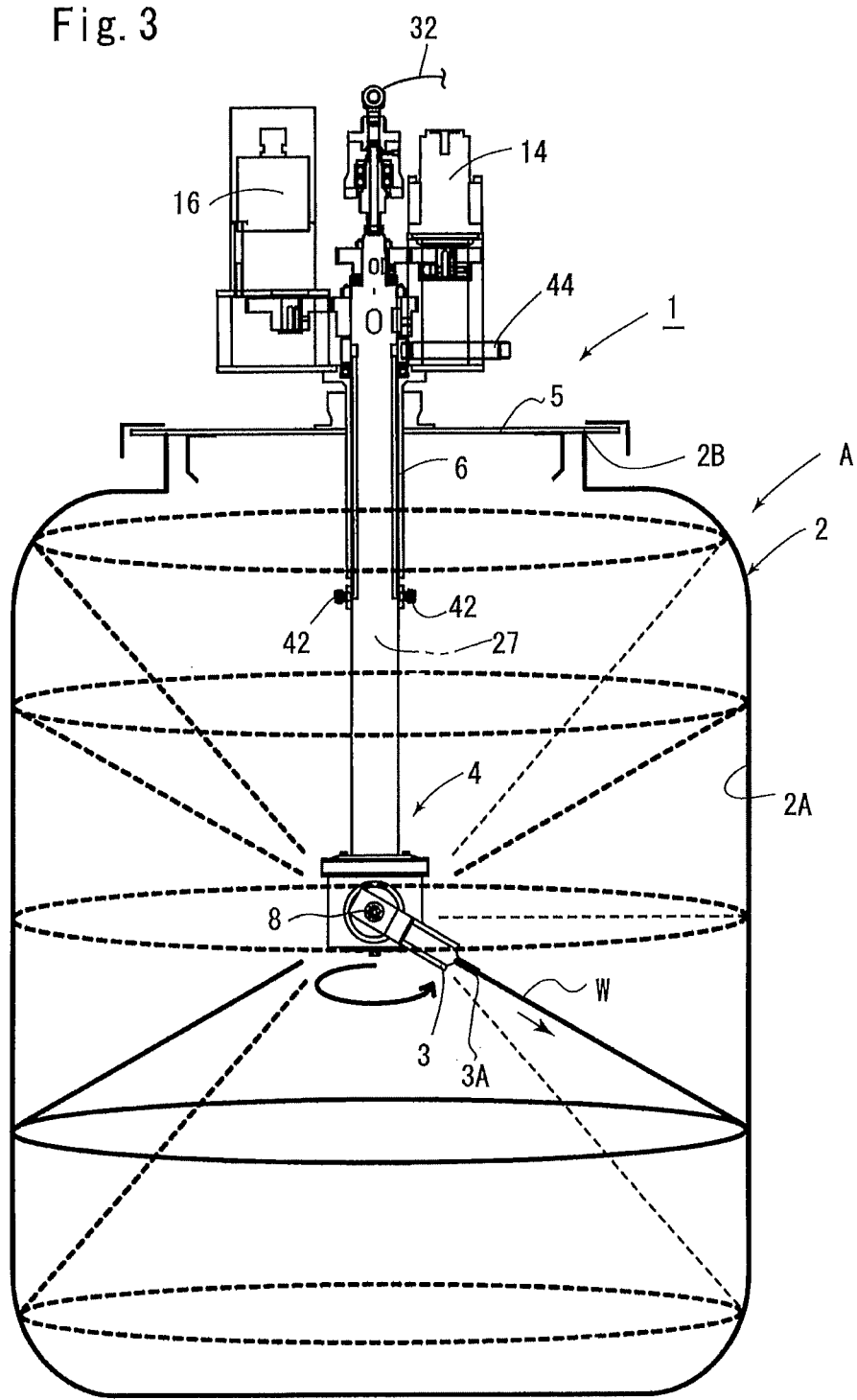
FIG. 3 is an explanatory diagram to show a movement trajectory of a nozzle of the cleaning apparatus of FIG. 1.

In that case, as shown by a solid line in FIG. 3, the nozzle 3 is maintained to be inclined at a predetermined angle, that is, the rotation of the nozzle 3 is stopped, and is revolved in that state. As a result of this, the cleaning fluid W is sprayed towards predetermined positions of the inner surface 2A from the nozzle 3 which is maintained to be inclined at the predetermined angle, and those positions are preferentially cleaned (see FIG. 3).

In this way, by appropriately changing the rotational frequency of the second motor 16 for each predetermined time period, and pivoting and thereafter stopping the pivot rotary shaft 8, a state in which the nozzle 3 is stopped at different inclination angles for multiple times is realized so that the cleaning fluid W is preferentially sprayed onto multiple areas in the inner surface 2A from the nozzle 3 which is inclined at each inclination angle (see the imaginary line in FIG. 3). This makes it possible to perform finish cleaning preferentially on multiple areas of the inner surface 2A of the tank 2 which are difficult to be cleaned.

When the cleaning operation of the inner surface 2A of the tank 2 is finished in this way, the operations of both the motors 14 and 16 and the supply source 33 are stopped.

As described so far, according to the present embodiment, it is possible to move the nozzle 3 in various movement trajectories by controlling the operations of the first motor 14 and the second motor 16 by the control device 18 even if the combination of the number of teeth between the bevel gears 11 and 12 is constant.

For example, a specific example other than those described above is one in which when only the second motor 16 is operated with the first motor 14 being stopped, the nozzle 3 rotates at its position without being revolved. Thereby, it is possible to preferentially clean corners, etc. of the inner surface 2A of the tank 2 with the cleaning fluid W. Especially, when the shape of the tank 2, which is an object to be cleaned, is angular, although defective cleaning is likely to occur in an angular corner, it is possible to effectively clean the corner by stopping the revolution of the nozzle 3 at a position in which the nozzle 3 is oriented toward the corner, and rotating the nozzle 3 at that position.

Moreover, in another embodiment, it is possible to densify the movement trajectory of the nozzle 3 by gradually changing the rotational frequency of the second motor 16 from a state in which both the motors 14 and 16 are being operated. Further, it is also possible to move the nozzle 3 in a spiral movement trajectory by gradually changing the rotational frequency of the second motor 16 thereby gradually changing the inclination angle of the nozzle 3 with both the motors 14 and 16 being operated. Since this obviates the need of cleaning the top face, which is useless particularly when the object to be cleaned is a cylindrical pot having an open top face, it is possible to perform efficient cleaning.

According to the present embodiment, it becomes possible to preferentially spray the cleaning fluid W toward a specific area, which is difficult to be cleaned, of the inner surface 2A of the tank 2. For that reason, it is possible to prevent the occurrence of defective cleaning and imperfect cleaning in a specific area after the end of the cleaning operation, as well as to reduce the cleaning time. Moreover, it is possible to provide a cleaning apparatus 1 that can suppress the consumption of the cleaning fluid W (water) and electricity of the power source, and efficiently clean the tank 2.

Figure 4:
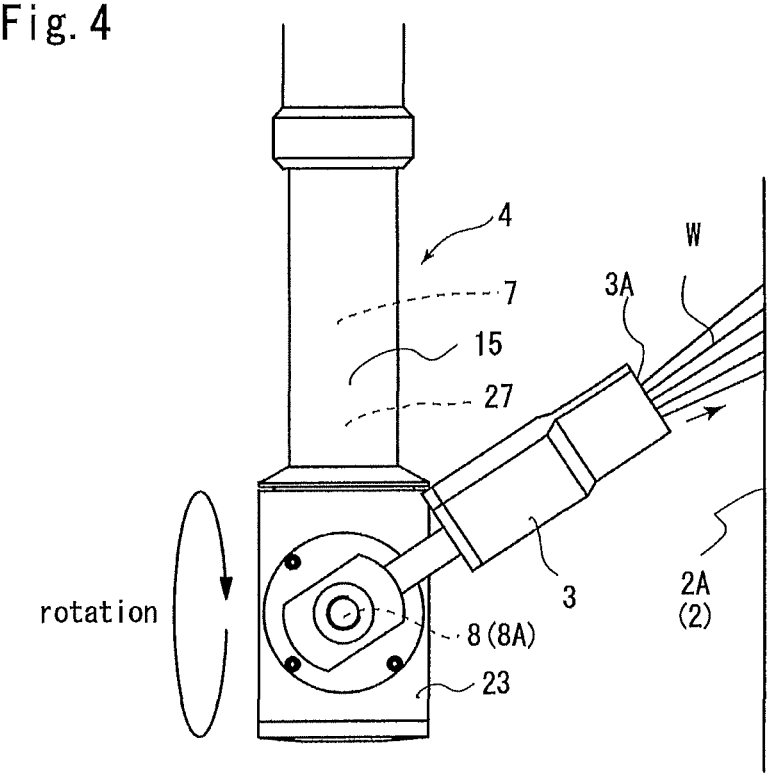
FIG. 4 is a front view of a principal part to show another embodiment of the present invention.
Figure 5:
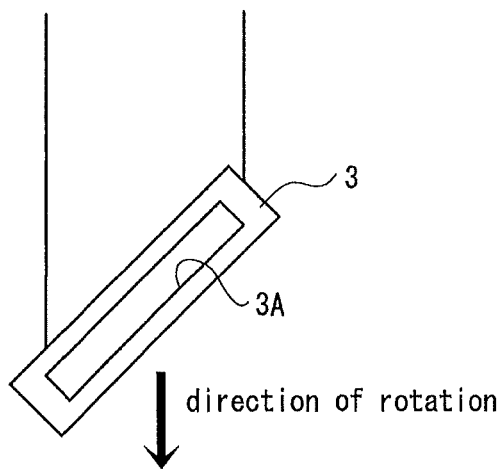
FIG. 5 is an explanatory diagram of the principal part of FIG. 4.

Next, FIGS. 4 to 7 shows other embodiments of the present invention. While, in the above described embodiment, the nozzle 3 is attached to the pivot rotary shaft 8 such that the longitudinal direction of the spray aperture 3A at the tip end of the nozzle 3 is substantially parallel with the axis of the pivot rotary shaft 8, the nozzle 3 may be attached to the pivot rotary shaft 8 with the longitudinal direction of the spray aperture 3A being inclined by about 45° with respect to the axis of the pivot rotary shaft 8 as shown in FIGS. 4 to 7. FIGS. 4 and 5 shows a state in which the nozzle 3 is rotated around the pivot rotary shaft 8 without being revolved and, in this case, the nozzle 3 is configured to be rotated with the longitudinal direction of its spray aperture 3A being inclined by 45° with respect to the axis of the pivot rotary shaft 8.

Figure 6:
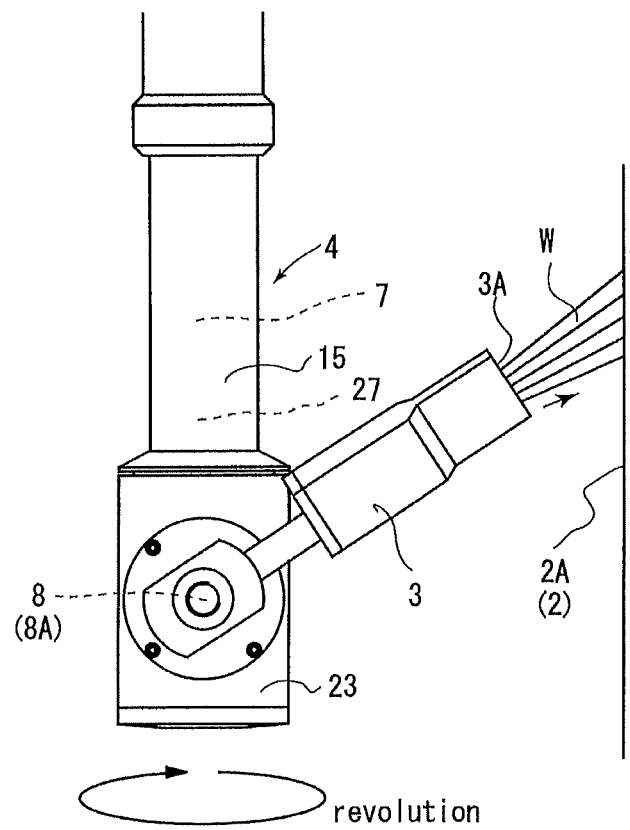
FIG. 6 is a front view of a principal part to show another embodiment of the present invention.
Figure 7:
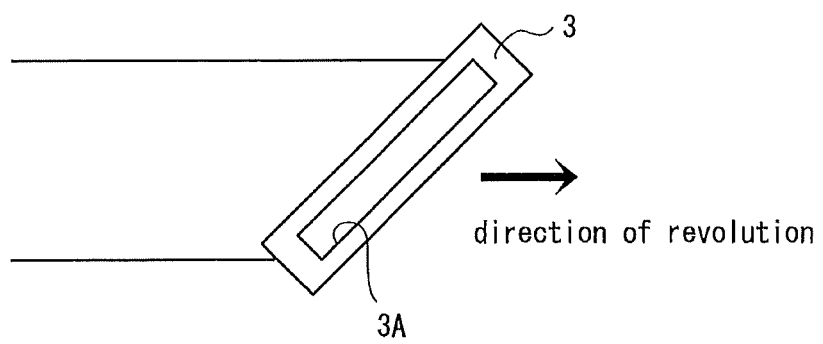
FIG. 7 is an explanatory diagram of the principal part of FIG. 6.

Moreover, FIGS. 6 and 7 show a state in which the nozzle 3 is revolved without being rotated and, in this case, the nozzle 3 is configured to revolve with the longitudinal direction of its spray aperture 3A being inclined by 45° with respect to the axis of the pivot rotary shaft 8.

That is, in any of the cases where the nozzle 3 is rotated without being revolved, the nozzle 3 is rotated while being revolved, and the nozzle 3 is revolved without being rotated, it is possible to spray a wide-width of the cleaning fluid W.

Particularly as shown in FIGS. 6 and 7, when the nozzle 3 is revolved without being rotated by configuring such that the nozzle 3 is attached to the pivot rotary shaft 8 with the longitudinal direction of the spray aperture 3A being inclined by about 45° with respect to the axis of the pivot rotary shaft 8, it is possible to increase the sprayed region of the cleaning fluid W to be sprayed from the spray aperture 3A of the nozzle 3 than in the embodiment described above, which is effective. To be specific, it is possible to spray a wide-width of the cleaning fluid W targeting the peripheries of the upper and lower corners of the tank 2 where dirt is hard to remove, and the periphery of the liquid level where dirt is likely to be accumulated. Moreover, since it is always possible to spray a wide-width of the cleaning fluid W onto the inner surface 2A of the tank 2 not only in the case where the nozzle 3 is revolved without being rotated, it is possible to adopt more various movement trajectories of the nozzle 3 than in the above described embodiment in which the longitudinal direction of the spray aperture 3A is substantially parallel with the axis of the pivot rotary shaft 8, thereby efficiently cleaning the inner surface 2A of the tank 2. Note that the angle by which the spray aperture 3A is inclined with respect to the axis of the pivot rotary shaft 8 may be, without being limited to 45°, in a range of 30° to 60°.

Note that the angle by which the spray aperture 3A of the nozzle 3 is inclined with respect to the axis of the pivot rotary shaft 8 may be changed depending on the shape of the object to be cleaned and the condition of the dirt.

Moreover, the cross-section shape of the nozzle 3 may be an elliptic shape or other shapes provided that a wide-width of the cleaning fluid W can be sprayed.

Note that although a second cleaning fluid passage 41 is provided in the outer tube 15 in the above described embodiment, this may be omitted.

Moreover, although the above described embodiment is configured such that the nozzle 3 is inserted from upward into the tank 2 and the nozzle 3 is revolved and rotated in that state, the nozzle 3 may be inserted from sideward or downward of the object to be cleaned into the object to be cleaned, depending on the shape of the object to be cleaned to perform cleaning.

DESCRIPTION OF SYMBOLS

1 Cleaning apparatus
2 Tank (object to be cleaned)
2A Inner surface
3 Nozzle
7 Inner tube (rotary shaft)
8 Pivot rotary shaft
11 Bevel gear
12 Bevel gear
14 First motor (first drive source)
15 Outer tube
16 Second motor (second drive source)
18 Control device
27 Cleaning fluid passage
W Cleaning fluid

What is claimed is:

1. A cleaning apparatus, comprising:
a rotary shaft supported to be axially rotatable;
a first fluid passage formed in the rotary shaft;
a pivot rotary shaft supported to be axially rotatable in a direction substantially orthogonal to the rotary shaft, and revolved with the rotary shaft as a rotational center;
a second fluid passage provided in the pivot rotary shaft and being in communication with the first fluid passage;
a nozzle provided on the pivot rotary shaft and for spraying a cleaning fluid to an object to be cleaned, the cleaning fluid being supplied via the first fluid passage and the second fluid passage;
an outer tube surrounding the rotary shaft and being supported to be axially rotatable;
a first bevel gear provided on the outer tube;
a second bevel gear provided on the pivot rotary shaft and meshing with the first bevel gear;
a first drive source for rotating the rotary shaft;
a second drive source for rotating the outer tube; and
a control device for controlling the operations of the first drive source and the second drive source, wherein
the nozzle is inserted into the object to be cleaned, and a cleaning fluid is sprayed from the nozzle to clean the inner surface of the object to be cleaned, the cleaning apparatus being characterized in that
the control device is capable of operating the first drive source and the second drive source at the same time, and is also capable of controlling rotational frequencies of both the drive sources to change a movement trajectory of the nozzle when the nozzle sprays the cleaning fluid.

2. The cleaning apparatus according to claim 1, characterized in that
the control device controls the rotational frequencies of both the drive sources to stop axial rotation of the pivot rotary shaft, and can cause the nozzle to be revolved with the rotation of the nozzle being stopped.

3. The cleaning apparatus according to claim 1, characterized in that
the control device can move the nozzle in a spiral movement trajectory by controlling the rotational frequencies of both the drive sources such that the nozzle is revolved while an inclination direction of the nozzle is gradually changed by gradually changing axial rotation of the pivot rotary shaft.

4. The cleaning apparatus according to claim 1, characterized in that
another cleaning fluid passage for feeding a cleaning fluid different from said cleaning fluid is formed in the outer tube, and a spray aperture for spraying a cleaning fluid supplied to the cleaning fluid passage toward an object to be cleaned is formed at a predetermined position of the outer tube.

5. The cleaning apparatus according to claim 1, characterized in that
the nozzle has a flat spray aperture at a tip end, and is provided on the pivot rotary shaft in a state of being inclined by 30° to 60° with respect to the axis of the pivot rotary shaft.

6. A cleaning apparatus, comprising:
a rotary shaft supported to be axially rotatable;
a first fluid passage formed in the rotary shaft;
a pivot rotary shaft supported to be axially rotatable in a direction substantially orthogonal to the rotary shaft, and revolved with the rotary shaft as a rotational center;
a second fluid passage provided in the pivot rotary shaft and being in communication with the first fluid passage;
a nozzle provided on the pivot rotary shaft and for spraying a cleaning fluid to an object to be cleaned, the cleaning fluid being supplied via the first fluid passage and the second fluid passage;
an outer tube surrounding the rotary shaft and being supported to be axially rotatable;
a first bevel gear provided on the outer tube;
a second bevel gear provided on the pivot rotary shaft and meshing with the first bevel gear;
a first drive source for rotating the rotary shaft;
a second drive source for rotating the outer tube; and
a control device for controlling the operations of the first drive source and the second drive source, wherein
the nozzle is inserted into the object to be cleaned, and a cleaning fluid is sprayed from the nozzle to clean the inner surface of the object to be cleaned, the cleaning apparatus being characterized in that
the control device is capable of operating the second drive source with the operation of the first drive source being stopped, to cause the nozzle to be rotated without being revolved.

* * * * *